United States Patent
Schwartz et al.

(10) Patent No.: US 7,945,094 B2
(45) Date of Patent: May 17, 2011

(54) METHOD FOR CHROMATIC ADAPTATION OF IMAGES

(75) Inventors: Tomer Schwartz, Even Yehuda (IL); Daniel Seidner, Herzlia (IL)

(73) Assignee: Eastman Kodak Company, Rochester, NY (US)

(*) Notice: Subject to any disclaimer, the term of this patent is extended or adjusted under 35 U.S.C. 154(b) by 707 days.

(21) Appl. No.: 12/014,961

(22) Filed: Jan. 16, 2008

(65) Prior Publication Data

US 2009/0180686 A1   Jul. 16, 2009

(51) Int. Cl.
*G06K 9/00* (2006.01)
(52) U.S. Cl. .................. 382/167; 382/162; 382/166
(58) Field of Classification Search .............. 382/162, 382/166, 167; 348/222.1, 223.1, 226.1; 345/589, 345/593; 358/520, 523, 1.9
See application file for complete search history.

(56) References Cited

U.S. PATENT DOCUMENTS

| | | | |
|---|---|---|---|
| 5,805,213 A * | 9/1998 | Spaulding et al. | 348/222.1 |
| 6,229,916 B1 * | 5/2001 | Ohkubo | 382/167 |
| 7,605,823 B2 * | 10/2009 | Stokes et al. | 345/589 |
| 7,697,176 B2 * | 4/2010 | Edge | 358/518 |
| 2005/0134879 A1 | 6/2005 | Fuchs et al. | |

FOREIGN PATENT DOCUMENTS

| | | |
|---|---|---|
| EP | 1 311 111 A2 | 5/2003 |
| EP | 1 771 013 A2 | 4/2007 |
| WO | WO2007/143729 A1 | 12/2007 |

OTHER PUBLICATIONS

Wyszecki et al.; Color Science, Concepts and Methods, Quantitative Data and Formulae; 2nd Edition, pp. 224-228.
Ian Lyons: "Pictographics inCamera Professional 3", Internet Citation, [Online] XP002278169 Reviewed from the Internet: URL:www.computer-darkroom.com/incamera/incamera.htmand.../incamera__2.htm> [retrieved on Apr. 27, 2004] the whole document.

* cited by examiner

*Primary Examiner* — Anh Hong Do
(74) *Attorney, Agent, or Firm* — Nelson Adrian Biish

(57) ABSTRACT

A method for a chromatic adaptation transformation of images using temperature and tint space comprises the steps of: acquiring a red, green, blue (RGB) image using a camera (11); providing neutral RGB values for camera specific, and at least one of a selected highlight and shadow values, to produce a 3D lookup transformation table (21); calibrating the RGB image by applying the 3D lookup transformation table to produce a calibrated RGB image (22); calculating a Von Kries transform from specific temperature and tint values (14); and applying a chromatic adaptation to the calibrated RGB image using the Von Kries transform to produce a modified RGB image chromatically adapted (15), while maintaining neutral RGB values for highlight and shadow regions.

8 Claims, 3 Drawing Sheets

Table : Stiles and Burch (1955) 2-deg and 10-deg, RGB Color Matching table

| nm | A | D65 | x_2 | y_2 | z_2 | x_10 | y_10 | z_10 |
|---|---|---|---|---|---|---|---|---|
| 360 | 6.14 | 46.64 | 0.00 | 0.00 | 0.00 | 0.00 | 0.00 | 0.00 |
| 370 | 7.82 | 52.09 | 0.00 | 0.00 | 0.00 | 0.00 | 0.00 | 0.00 |
| 380 | 9.80 | 49.98 | 0.00 | 0.00 | 0.01 | 0.00 | 0.00 | 0.00 |
| 390 | 12.09 | 54.65 | 0.00 | 0.00 | 0.02 | 0.00 | 0.00 | 0.01 |
| 400 | 14.71 | 82.75 | 0.01 | 0.00 | 0.07 | 0.02 | 0.00 | 0.09 |
| 410 | 17.68 | 91.49 | 0.04 | 0.00 | 0.21 | 0.08 | 0.01 | 0.39 |
| 420 | 21.00 | 93.43 | 0.13 | 0.00 | 0.65 | 0.20 | 0.02 | 0.97 |
| 430 | 24.67 | 86.68 | 0.28 | 0.01 | 1.39 | 0.31 | 0.04 | 1.55 |
| 440 | 28.70 | 104.87 | 0.35 | 0.02 | 1.75 | 0.38 | 0.06 | 1.97 |
| 450 | 33.09 | 117.01 | 0.34 | 0.04 | 1.77 | 0.37 | 0.09 | 1.99 |
| 460 | 37.81 | 117.81 | 0.29 | 0.06 | 1.67 | 0.30 | 0.13 | 1.75 |
| 470 | 42.87 | 114.86 | 0.20 | 0.09 | 1.29 | 0.20 | 0.19 | 1.32 |
| 480 | 48.24 | 115.92 | 0.10 | 0.14 | 0.81 | 0.08 | 0.25 | 0.77 |
| 490 | 53.91 | 108.81 | 0.03 | 0.21 | 0.47 | 0.02 | 0.34 | 0.42 |
| 500 | 59.86 | 109.35 | 0.00 | 0.32 | 0.27 | 0.00 | 0.46 | 0.22 |
| 510 | 66.06 | 107.80 | 0.01 | 0.50 | 0.16 | 0.04 | 0.61 | 0.11 |
| 520 | 72.50 | 104.79 | 0.06 | 0.71 | 0.08 | 0.12 | 0.76 | 0.06 |
| 530 | 79.13 | 107.69 | 0.17 | 0.86 | 0.04 | 0.24 | 0.88 | 0.03 |
| 540 | 85.95 | 104.41 | 0.29 | 0.95 | 0.02 | 0.38 | 0.96 | 0.01 |
| 550 | 92.91 | 104.05 | 0.43 | 0.99 | 0.01 | 0.53 | 0.99 | 0.00 |
| 560 | 100.00 | 100.00 | 0.59 | 1.00 | 0.00 | 0.71 | 1.00 | 0.00 |
| 570 | 107.18 | 96.33 | 0.76 | 0.95 | 0.00 | 0.88 | 0.96 | 0.00 |
| 580 | 114.44 | 95.79 | 0.92 | 0.87 | 0.00 | 1.01 | 0.87 | 0.00 |
| 590 | 121.73 | 88.69 | 1.03 | 0.76 | 0.00 | 1.12 | 0.78 | 0.00 |
| 600 | 129.04 | 90.01 | 1.06 | 0.63 | 0.00 | 1.12 | 0.66 | 0.00 |
| 610 | 136.35 | 89.60 | 1.00 | 0.50 | 0.00 | 1.03 | 0.53 | 0.00 |
| 620 | 143.62 | 87.70 | 0.85 | 0.38 | 0.00 | 0.86 | 0.40 | 0.00 |
| 630 | 150.84 | 83.29 | 0.64 | 0.27 | 0.00 | 0.65 | 0.28 | 0.00 |
| 640 | 157.98 | 83.70 | 0.45 | 0.18 | 0.00 | 0.43 | 0.18 | 0.00 |
| 650 | 165.03 | 80.03 | 0.28 | 0.11 | 0.00 | 0.27 | 0.11 | 0.00 |
| 660 | 171.96 | 80.21 | 0.16 | 0.06 | 0.00 | 0.15 | 0.06 | 0.00 |
| 670 | 178.77 | 82.28 | 0.09 | 0.03 | 0.00 | 0.08 | 0.03 | 0.00 |
| 680 | 185.43 | 78.28 | 0.05 | 0.02 | 0.00 | 0.04 | 0.02 | 0.00 |
| 690 | 191.93 | 69.72 | 0.02 | 0.01 | 0.00 | 0.02 | 0.01 | 0.00 |
| 700 | 198.26 | 71.61 | 0.01 | 0.00 | 0.00 | 0.01 | 0.00 | 0.00 |
| 710 | 204.41 | 74.35 | 0.01 | 0.00 | 0.00 | 0.00 | 0.00 | 0.00 |
| 720 | 210.37 | 61.60 | 0.00 | 0.00 | 0.00 | 0.00 | 0.00 | 0.00 |
| 730 | 216.12 | 69.89 | 0.00 | 0.00 | 0.00 | 0.00 | 0.00 | 0.00 |
| 740 | 221.67 | 75.09 | 0.00 | 0.00 | 0.00 | 0.00 | 0.00 | 0.00 |

FIG. 3

METHOD FOR CHROMATIC ADAPTATION OF IMAGES

FIELD OF THE INVENTION

This invention relates to chromatic adaptation of images acquired by a digital camera in different lighting conditions.

BACKGROUND OF THE INVENTION

Digital capture has many advantages over traditional film capture. One of them is the ability to use a single sensor to capture images in different lighting conditions, whereas in the film realm, films with different sensitivity are used in different lighting conditions.

Digital capture can be easily adapted to new lighting conditions by sampling a digitally acquired gray patch image. A chromatic adaptation transform is performed using sampled points of the captured gray patch image. This transformation complies with the adaptation to the new lighting conditions, however, often this technique is not sufficient, especially in cases where highlight and shadow reference points are required.

Current technique to overcome deficiencies caused by different lighting conditions, while acquiring a digital image, using digital capture are not completely adequate. For example, an image is acquired by a digital camera at non-standard lighting conditions. The acquired image is displayed on a color display, at this stage the user is asked to select areas on the displayed image that were gray on the captured object, for example, a gray patch or a gray area in the captured object. The red, green, and blue (RGB) values of the specified area are sampled, and are used for camera recalibration to the lighting conditions. This method is being used in some camera products, and is called mid-tone picker calibration. Although this method is satisfactory in the case of most acquired images, and results in adequate colors, it often requires additional handling to perfect the image. In certain cases, highlight and shadow areas will show deviation from gray.

FIG. 1 shows a prior art method in which an image is acquired in camera RGB 11 space. The acquired image camera RGB space are converted to reference output medium metric (romm) RGB 13 space, using a camera to romm matrix multiplication 12. Romm space is typically used for efficient image processing. The mid-tone picker calibration is better used with temperature and tint values. Those two values are computed by applying a temperature and tint transformation 14 on the romm RGB space values 13.

At this stage, a transformation is made on the entire image from the adjusted temperature and tint values by the mid-tone picker calibration into modified romm RGB 15 values. This multiplication is done in the cone space, where a Von Kries transformation is performed, according to temperature and tint values. The modified romm RGB is converted using International Color Consortium (ICC) profile transformation 16 into designated output RGB 17 space.

This mid-tone calibration method fails to preserve the ratio between the colors in all the instances, it is mostly evident when the ratio is 1:1, typically expected for gray values. The currently used highlight and shadow recalibration methods, will fail to produce good results when using in conjunction with the flow described above. The reason for that is due to the fact that the highlight and shadow recalibration will not be preserved at the output RGB 17 space. Therefore, a tool that recalibrates the gray in the highlight and shadow values would be valuable.

The enclosed invention proposes a method to overcome this deficiency caused by the mid-tone picker calibration method. A transformation for highlight and shadow reference points, when the chromatic adaptation transformation is done by a temperature and tint finding method would be desirable.

SUMMARY OF THE INVENTION

Briefly, according to one embodiment of the present invention a method for a chromatic adaptation transformation of images using temperature and tint space comprises the steps of: acquiring a red, green, blue (RGB) image using a camera; providing neutral RGB values for camera specific, and at list one of a selected highlight and shadow values, to produce a 3D lookup transformation table; calibrating the RGB image by applying the 3D lookup transformation table to produce a calibrated RGB image; calculating a Von Kries transform from specific temperature and tint values; and applying a chromatic adaptation to the calibrated RGB image using the Von Kries transform to produce a modified RGB image chromatically adapted, while maintaining neutral RGB values for highlight and shadow regions.

The present invention adds a new transformation in front of the color conversion chain described in the background and illustrated by FIG. 1, in order to achieve accurate highlight and shadow calibration.

The mid-tone neutral is assumed to be performed by the temperature and tint transformation 14. The 3D lookup table 21 will define the transformation that will make the highlight or shadow grays neutrals. To calculate this transformation six inputs derived from a gray area in the highlights or the shadows regions are needed. The modified romm RGB 15 values and the camera RGB values 11. From the modified romm RGB values a new wanted modified romm R'G'B' values is calculated. The calculation of R'G'B' can be represented in the following simplified formula:

$$R'=G'=B'=C_1R+C_2G+C_3B$$

Where R' G' B' are the wanted modified romm values and R G B are the modified romm values. From R' G' B' one can calculate R" G" B" values that are the wanted. Modified camera RGB values 22, where C1, C2, and C3 are constant coefficients that can be calculated.

The modified romm RGB 15 are further applied for toning adjustment, by applying a 3D toning look-up table 18, before generation of a output RGB 17, by an ICC profile transformation 16. An optional route 23 is suggested, the modified romm RGB 15 is adjusted for exposure compensation and/or saturation adjustment 24, prior to applying 3D LUT toning 18 and ICC profile transformation 16.

BRIEF DESCRIPTION OF THE DRAWINGS

FIG. 3 is a schematic illustrating a RGB color matching table.

DETAILED DESCRIPTION OF THE INVENTION

Figure 1:
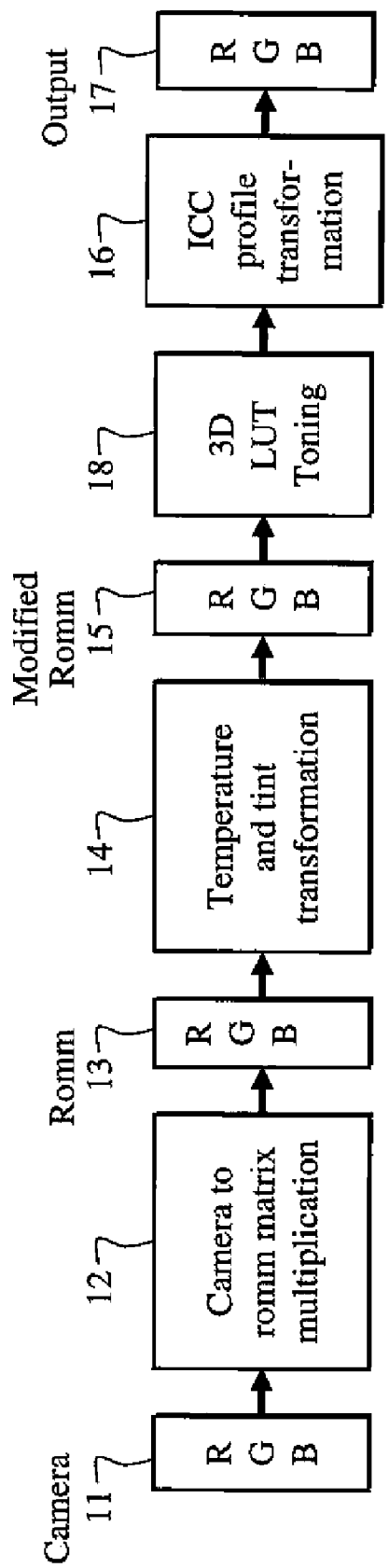
FIG. 1 is a schematic illustrating a prior art chain of color transformation.
Figure 2:
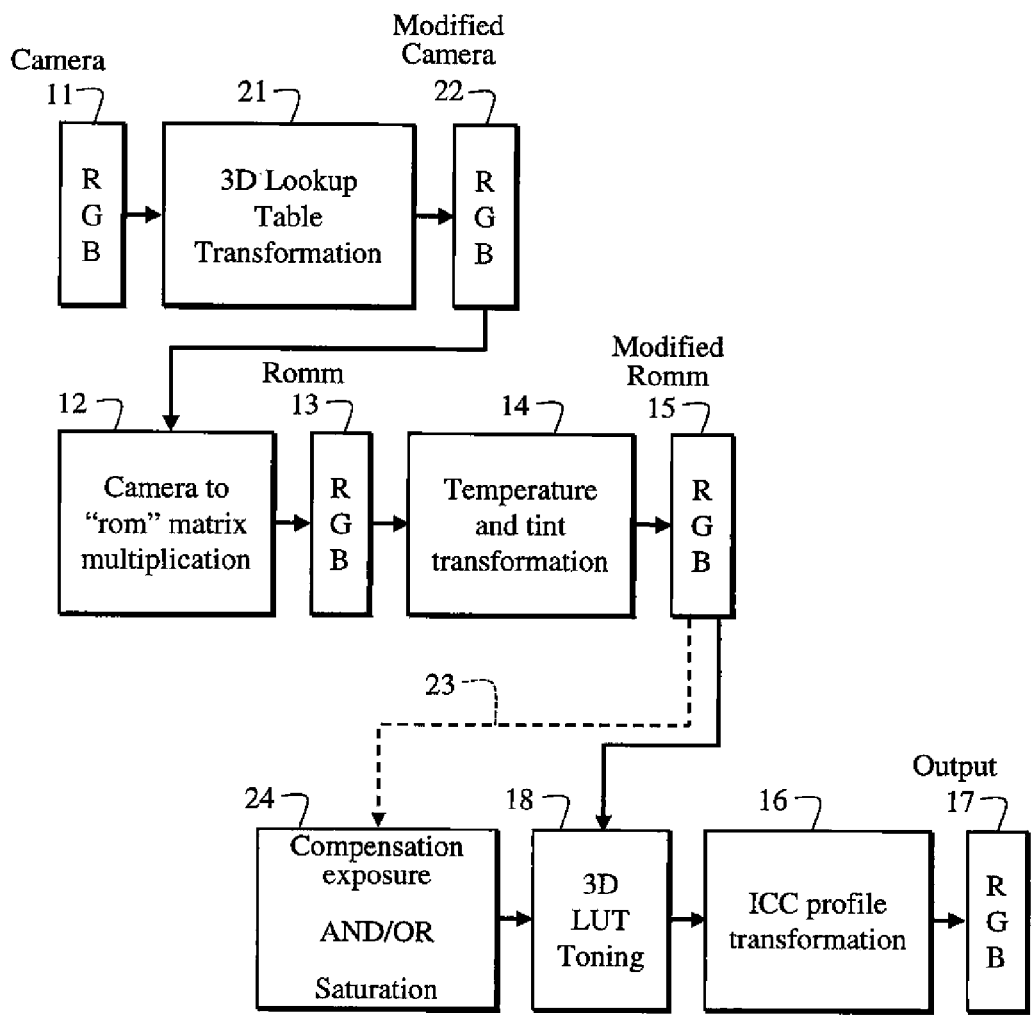
FIG. 2 is a schematic illustrating a chain of color transformation according to the present invention, so highlight and shadow gray is preserved.

Although the present invention pertains, in general, to all methods of calculating temperature and tint values the method described herein is directed to a particular embodiment. Another implementation is found in "Color Science, Concepts and Methods, Quantitative Data and Formulae" by G. Wyszecki and W. S. Stiles, $2^{nd}$ Edition, pp. 224-228. The base for the neutral to temperature transform is the Stiles and Burch (1955) 2-deg, RGB color matching table, shown in FIG. 3. The color matching transform is a table of the tree tristimulus values vs. frequency values. The table is converted to a table of temperature versus neutrals.

The conversion of the table is to find the X,Y,Z values per temperature. The following equations define the transformation.

$$X = \int \phi(\lambda) x(\lambda) d\lambda$$
$$Y = \int \phi(\lambda) y(\lambda) d\lambda$$
$$Z = \int \phi(\lambda) z(\lambda) d\lambda,$$

Wherein $\phi(\lambda)$ is the spectral power distribution of the stimulus x,y,z; and $\lambda$ is the wavelength. The spectral power distribution for black body is $$\phi(\lambda) = c_1 \lambda^{-5} \left[ \exp\left(\frac{c_2}{\lambda T}\right) - 1 \right].$$

Where $c_1 = 2\pi hc$;

$$c_2 = \frac{hc}{k};$$

h is plank constant; k is boltmann's constant; c is the speed of light; and T is the temperature in Kelvin. Using these equations, finding X,Y,Z values can be simply implemented as a sum over all frequency values normalized such that Y equals 1.

The neutral points that were calculated in the table are in the profile connection space (PCS) space of tristimulus values, but the present invention uses them in the cone space. Therefore, the neutrals are transformed into cone space. The transform is a multiplication by the following 3×3 matrix.

$$\begin{pmatrix} 0.7328 & 0.4296 & -0.1624 \\ -0.7036 & 1.6975 & 0.0061 \\ 0.0030 & 0.0136 & 0.9834 \end{pmatrix}$$

In order to determine the temperature given a neutral value the converted tables are searched to find the two closest points in the table to the input neutral. It is assumed that the temperature is between those two points. Given the two closest points extrapolating linearly between the two points to find the right temperature is done.

If a point is defined by $(T_1, X_1, Y_1)$ wherein T is the temperature; and X, Y are the tristimulus values (remember that Z=1−X−Y), then the new temperature will be:

$$T_{white} = \frac{T_x + T_y}{2}$$

$$T_I = T_1 + (I_c - I_1) \frac{T_1 - T_2}{I_1 - I_2}, I = X, Y$$

$(T_c, X_c, Y_c)$ is a point that is a projection of the input neutral on the line connecting the two points that where found to be the closest in the table.

Since this point of temperature does not represent the exact neutral the tint is also calculated. The tint is the distance between the temperature point to the input neutral point.

$$Tint = \sqrt{(X-X_c)^2 + (Y-Y_c)^2}.$$

The inverse transform (temperature to neutral) is first a search to find the two temperatures between them the input temperature. The neutral corresponding to zero tint is found by linear extrapolation. The neutral point is calculated as the point where a tint, from the neutral point of zero tint, is added in the perpendicular direction to the line between the two closest temperatures.

The full sequence of steps is as follows. At the beginning the input camera RGB are multiplied by three values that are called neutrals. (The multiplication is the added LUT in the present invention.) Those numbers are determined in the factory and can be specific for the camera from which they where taken. Then multiply the result by a 3×3 matrix. This matrix is also found in the factory and can be camera specific. The output of the transform so far is the romm RGB space. From this space the RGB is calculated that correspond to the cone space by the following matrix multiplication.

$$\begin{pmatrix} 0.4895 & 0.5726 & -0.0979 \\ -0.2898 & 1.3321 & -0.0423 \\ 0.0025 & 0.0112 & 0.8112 \end{pmatrix}.$$

In the cone space the neutrals that are calculated by the temperature and tint are used. This step is done by the Von Kries chromatic adaptation model. The last step is conversion back into romm space. From this description it is easy to derive the inverse calculation that is used in the present invention.

In the present invention the neutral is changed at the beginning of the chain to be a 3D LUT. If no highlight and shadow pick was done, then the 3D LUT is three strait lines that are the result of multiplication by a factory neutral. Once a pick value is used, an extrapolation can be made, such that the lines will now pass at the desired neutral output. Possible solutions can be spline curve or any other similar extrapolation.

For example, for each separation the range of influence of the new point was determined. As a default the new highlight or shadow point will influence all points that are 0.5 f-stop smaller or bigger respectively. Therefore, the following equations to reproduce the LUT.

$$p = \begin{cases} Lslope(i - Dx) + Dy, & i = 0, \ldots Dx - 1 \\ i \cdot f + (Dy - Dx \cdot f)\left(\frac{i - Dx}{Ls - Dx}\right)^2, & i = Dx, \ldots Ls - 1 \\ i \cdot f, & i = Ls, \ldots Hs - 1 \\ i \cdot f + (Ly - Lx \cdot f)\left(\frac{i - Lx}{Hs - Lx}\right)^2, & i = Hs, \ldots Lx - 1 \\ Hslope(i - Lx) + Ly & i = Lx, \ldots \max \end{cases}$$

Wherein Dx,Dy are the measured values and the wanted value in the shadow pick, Lx,Ly are the measured value and the wanted value in the highlight pick, and f is the slope that correspond the multiplication done before any pick is done (Factory neutral). Ls,Hs are the values, for highlight and shadow, where the influence of the pick to starts.

$$Lslope = 2\left(\frac{Dy - Dx \cdot f}{Dx - Ls}\right) + f$$

$$Hslope = 2\left(\frac{Ly - Lx \cdot f}{Lx - Hs}\right) + f.$$

Wherein p is the LUT output and i is the LUT input.

The invention has been described in detail with particular reference to certain preferred embodiments thereof, but it will be understood that variations and modifications can be effected within the scope of the invention.

PARTS LIST 11 camera RGB
12 camera to romm matrix multiplication
13 romm RGB
14 temperature and tint transformation
15 modified romm RGB
16 ICC profile transformation
17 output RGB
18 3D LUT toning
21 3D lookup table transformation
22 modified camera RGB
23 optional route
24 exposure compensation and/or saturation adjustment

The invention claimed is:

1. A method for a chromatic adaptation transformation of images using temperature and tint space comprising the steps of:
    acquiring a red, green, and blue (RGB) image using a camera;
    providing neutral RGB values for camera specific and at least one of selected highlight and shadow values to produce a 3D lookup transformation table;
    calibrating said RGB image by applying said 3D lookup transformation table to produce a calibrated RGB image;
    calculating a Von Kries transform from specific temperature and tint values; and
    applying a chromatic adaptation to the said calibrated RGB image using said Von Kries transform to produce a modified RGB image chromatically adapted, while maintaining neutral RGB values for highlight and shadow regions.

2. The method of claim 1 further comprising applying saturation modification and/or exposure compensation modification means.

3. The method of claim 1 further comprising:
    applying 3D toning lookup table and International Color Consortium (ICC) profile transformation on said modified RGB image adapted to specific device.

4. The method of claim 1 wherein neutral RGB values are calibrated by factory calibration means.

5. The method of claim 1 wherein temperature and tint values are manually adjusted without affecting said neutral RGB values for highlight and shadow regions.

6. The method of claim 1 wherein temperature and tint values are manually adjusted and said neutral RGB values for highlight and shadow regions are recalculated.

7. The method of claim 3 wherein said 3D toning lookup table is changed according to a brightness value change.

8. The method of claim 3 wherein said 3D toning lookup table is changed according to a contrast value change.

* * * * *